(12) United States Patent
Hornung et al.

(10) Patent No.: US 12,099,447 B2
(45) Date of Patent: Sep. 24, 2024

(54) SETTING CACHE POLICY INFORMATION FOR PREFETCHED CACHE ENTRY

(71) Applicant: Arm Limited, Cambridge (GB)

(72) Inventors: Alexander Alfred Hornung, Cambridge (GB); Roberto Gattuso, Cambridge (GB)

(73) Assignee: Arm Limited, Cambridge (GB)

( * ) Notice: Subject to any disclaimer, the term of this patent is extended or adjusted under 35 U.S.C. 154(b) by 61 days.

(21) Appl. No.: 17/965,173

(22) Filed: Oct. 13, 2022

(65) Prior Publication Data

US 2024/0126697 A1  Apr. 18, 2024

(51) Int. Cl.
*G06F 12/0862* (2016.01)
*G06F 12/0811* (2016.01)
*G06F 12/0871* (2016.01)

(52) U.S. Cl.
CPC ...... *G06F 12/0862* (2013.01); *G06F 12/0811* (2013.01); *G06F 12/0871* (2013.01)

(58) Field of Classification Search
CPC ............. G06F 12/0862; G06F 12/0811; G06F 12/0871
See application file for complete search history.

(56) References Cited

U.S. PATENT DOCUMENTS

| | | | |
|---|---|---|---|
| 2006/0015688 A1* | 1/2006 | Schnapp | G06F 3/0611 711/143 |
| 2006/0179239 A1* | 8/2006 | Fluhr | G06F 12/0862 711/137 |
| 2013/0232320 A1* | 9/2013 | Dale | G06F 9/383 712/27 |
| 2019/0004954 A1* | 1/2019 | Kumar | G06F 12/0862 |
| 2020/0125492 A1* | 4/2020 | Bondarenko | G06F 12/12 |
| 2021/0182214 A1* | 6/2021 | Moyer | G06F 12/122 |
| 2022/0374367 A1* | 11/2022 | Fang | G06N 20/00 |
| 2022/0413866 A1* | 12/2022 | Nathella | G06F 9/3818 |

* cited by examiner

*Primary Examiner* — Ryan Bertram
(74) *Attorney, Agent, or Firm* — NIXON & VANDERHYE P.C.

(57) ABSTRACT

Prefetch circuitry generates, based on stream prefetch state information, prefetch requests for prefetching data to at least one cache. Cache control circuitry controls, based on cache policy information associated with cache entries in a given level of cache, at least one of cache entry replacement in the given level of cache, and allocation of data evicted from the given level of cache to a further level of cache. The stream prefetch state information specifies, for at least one stream of addresses, information representing an address access pattern for generating addresses to be specified by a corresponding series of prefetch requests. Cache policy information for at least one prefetched cache entry of the given level of cache (to which data is prefetched for a given stream of addresses) is set to a value dependent on at least one stream property associated with the given stream of addresses.

15 Claims, 5 Drawing Sheets

| Policy level | Initial replacement priority | Allocation policy |
|---|---|---|
| 0 | Default replacement priority | Allocate to L2$ on eviction from L1$ |
| 1 | Highest replacement priority | Allocate to L2$ on eviction from L1$ |
| 2 | Highest replacement priority | Allocate to L3$ on eviction from L1$ |
| 3 | Highest replacement priority | If dirty, allocate to L3$ on eviction from L1$; If clean, do not allocate to either L2$ or L3$ (or another cache) on eviction from L1$ |

→ increasing stream length, increasing prefetch rate

SETTING CACHE POLICY INFORMATION FOR PREFETCHED CACHE ENTRY

BACKGROUND

Technical Field

The present technique relates to the field of data processing.

Technical Background

A data processing apparatus may have a cache for caching data from a memory system. Cache control circuitry may control cache entry replacement in a given level of cache and/or allocation of data evicted from the given level of cache to a further level of cache. Entries may be associated with cache policy information set based on a cache replacement/allocation policy, for use in controlling the cache entry replacement and/or allocation to a further level of cache.

SUMMARY

At least some examples of the present technique provide an apparatus comprising:
  prefetch circuitry to generate, based on stream prefetch state information, prefetch requests for prefetching data to at least one cache; and
  cache control circuitry to control, based on cache policy information associated with cache entries in a given level of cache, at least one of:
    cache entry replacement in the given level of cache; and
    allocation of data evicted from the given level of cache to a further level of cache;
  in which:
    the stream prefetch state information specifies, for at least one stream of addresses, information representing an address access pattern for generating addresses to be specified by a corresponding series of prefetch requests; and
    at least one of the prefetch circuitry and the cache control circuitry is configured to control the cache policy information associated with at least one prefetched cache entry of the given level of cache to which data is prefetched for a given stream of addresses, to set the cache policy information for the at least one prefetched cache entry to a value dependent on at least one stream property associated with the given stream of addresses.

At least some examples of the present technique provide a non-transitory storage medium storing computer-readable code for fabrication of an apparatus comprising:
  prefetch circuitry to generate, based on stream prefetch state information, prefetch requests for prefetching data to at least one cache; and
  cache control circuitry to control, based on cache policy information associated with cache entries in a given level of cache, at least one of:
    cache entry replacement in the given level of cache; and
    allocation of data evicted from the given level of cache to a further level of cache;
  in which:
    the stream prefetch state information specifies, for at least one stream of addresses, information representing an address access pattern for generating addresses to be specified by a corresponding series of prefetch requests; and
    at least one of the prefetch circuitry and the cache control circuitry is configured to control the cache policy information associated with at least one prefetched cache entry of the given level of cache to which data is prefetched for a given stream of addresses, to set the cache policy information for the at least one prefetched cache entry to a value dependent on at least one stream property associated with the given stream of addresses.

At least some examples of the present technique provide a method comprising:
  generating, based on stream prefetch state information, prefetch requests for prefetching data to at least one cache; and
  controlling, based on cache policy information associated with cache entries in a given level of cache, at least one of:
    cache entry replacement in the given level of cache; and
    allocation of data evicted from the given level of cache to a further level of cache;
in which:
  the stream prefetch state information specifies, for at least one stream of addresses, information representing an address access pattern for generating addresses to be specified by a corresponding series of prefetch requests; and
  the method comprises controlling the cache policy information associated with at least one prefetched cache entry of the given level of cache to which data is prefetched for a given stream of addresses, to set the cache policy information for the at least one prefetched cache entry to a value dependent on at least one stream property associated with the given stream of addresses.

Further aspects, features and advantages of the present technique will be apparent from the following description of examples, which is to be read in conjunction with the accompanying drawings.

DESCRIPTION OF EXAMPLES

An apparatus has prefetch circuitry to generate, based on stream prefetch state information, prefetch requests for prefetching data to at least one cache; and cache control circuitry to control, based on cache policy information associated with cache entries in a given level of cache, at least one of: (i) cache entry replacement in the given level of cache; and (ii) allocation of data evicted from the given level of cache to a further level of cache. The stream prefetch state information specifies, for at least one stream of addresses, information representing an address access pattern for generating addresses to be specified by a corresponding series of prefetch requests.

Prefetch circuitry can be useful to improve performance by allowing data to be prefetched into the cache based on a prediction of which addresses will be accessed by processing circuitry in future, without waiting for the processing circuitry to actually issue memory access requests specifying those addresses. The predictions can be based on prefetch state information which may be maintained based on observation of past address access patterns made by demand access requests issued by processing circuitry. One approach to maintaining prefetch state information can be to track at least one stream of addresses, where each stream comprises addresses accessed according to an address access pattern represented by a corresponding set of stream prefetch state information. For example, a stream of addresses could comprise addresses accessed according to a stride pattern where successive addresses in the stream are separated by intervals of a constant stride length, or a multi-stride pattern involving addresses whose differences are based on a cyclic sequence of stride values. It is also possible to track streams of addresses accessed in a certain region of address space, where the stream information identifies the offsets of the accessed addresses relative to a start address (those offsets need not necessarily follow a regular stride pattern).

The inventors recognised that properties of a given stream of addresses tracked by the prefetch circuitry can be a useful proxy for the predicted reuse distance between one access to a given address and a subsequent access to the same address (the reuse distance being a measure of the number of other addresses accessed between the first access and the subsequent access to the same address, and hence a measure of the estimated performance boost (if any) which might be associated with caching that address in a given level of cache—if the reuse distance is greater than the benefit of caching that address in the given level of cache may be lower). Therefore, it can be useful for the prefetch circuitry and/or the cache control circuitry to control the cache policy information for at least one prefetched cache entry prefetched with data for a given stream of addresses, so as to set the cache policy information for the at least one prefetched cache entry based on at least one stream property of the given stream of addresses. By influencing cache replacement policy and/or cache allocation policy based on one or more stream properties tracked by the prefetch circuitry for a given stream of addresses, a better prediction can be made of which addresses are likely to be accessed again soonest, helping to improve performance because the resulting allocation of addresses to a particular level of cache can be more appropriate to the subsequent demand address access patterns made by processing circuitry. This helps to improve performance by reducing cache miss rates.

The responsibility for setting the cache policy information for prefetched cache entries could lie either with the prefetch circuitry, or with the cache control circuitry, or both in combination. For example, the prefetch circuitry could identify the value of the cache policy information to be set for a prefetched entry and transmit it to the cache control circuitry to update the cache policy information. Alternatively, the at least one stream property (or an indication of a policy "level" chosen based on the at least one stream property) could be transmitted to the cache control circuitry, and then the cache control circuitry could determine the corresponding value of any cache policy information to be stored in association with the prefetched cache entry. Therefore, it will be appreciated that there can be a number of different arrangements for ensuring that cache policy information for prefetched entry is set based on one or more stream properties.

Also, it will be appreciated that, in some implementations, the stream property of the given stream of addresses may not be the only parameter that influences the setting of the cache policy information for the at least one prefetched cache entry. For example, the cache control circuitry could also be dependent on other information relating to address access patterns made by the processing circuitry, or on configuration information set by a system designer or by software to configure how to set cache policy information, so the at least one stream property may be one of a number of parameters that influences the cache policy information set for the at least one prefetched entry.

The at least one stream property may comprise a length of the given stream of addresses. Hence, at least one of the prefetch circuitry and the cache control circuitry may set the cache policy information for the at least one prefetched cache entry to a value dependent on a length of the given stream of addresses. It is recognised that stream length can serve as a proxy for the predicted reuse distance and so can be useful property to use for determining policy information used to control cache replacement and/or allocation. The stream length may be an indication of how many cache entries are prefetched with data for addresses of the given stream of addresses.

The prefetch circuitry and/or the cache control circuitry may set the cache policy information for the at least one prefetched cache entry to provide at least one of: (i) a probability of the at least one prefetched cache entry being replaced in the given level of cache which increases with increasing length of the given stream of addresses; and (ii) a probability of data evicted from the at least one prefetched cache entry being allocated to the further level of cache which decreases with increasing length of the given stream of addresses. The inventors have recognised that for longer streams of addresses (streams which cause a larger number of prefetch requests to be generated by the prefetch circuitry), the reuse distance between one access to a given address and another is likely to be greater. For the longest prefetch streams, it is relatively likely that the access pattern is a streaming access pattern where each data accessed in that stream is used for a relatively short duration and then not needed again. Therefore, with increasing stream length, there can be less benefit in maintaining data for an address of that stream in a level of cache which is faster to access by processing circuitry (e.g. a level 1 or 2 cache), so it may be desirable to control the cache policy information for the prefetched entries for that stream so as to increase a probability of replacement at the given level of cache and/or decrease probability of allocation to the further level of cache when evicted from the given level of cache. By setting the cache policy information in this way, this can tend to improve performance.

Note that, in some examples where probability of allocation to a further level of cache is reduced with increasing stream length, the probability of allocation in any further level of cache may be reduced to zero for streams with longer stream length. For example, for streams longer than a certain threshold, if the data being evicted from the given level of cache is clean, a dataless eviction can be performed where the data is not allocated to any further level of cache.

In some examples, the prefetch circuitry and/or the cache control circuitry may set the cache policy information for the at least one prefetched cache entry to indicate a highest priority for replacement in the given level of cache when the length of the given stream of addresses is sufficiently long that a number of cache entries of the given level of cache that would be required to accommodate data for each address in the given stream would exceed a predetermined fraction of cache capacity of the given level of cache. This recognises that it may be undesirable for the majority of cache entries in the given level of cache to be allocated for data prefetched for a relatively long stream, as there may be a relatively high probability that the data from that stream will not be accessed again soon, and the cache capacity of the given level cache may be better used for other data not from stream. By setting the cache policy information to indicate the highest priority for replacement in the given level of cache once the length of stream is longer than a threshold length corresponding to a predetermined fraction of cache capacity, then for streams longer than this length, subsequent allocations for later addresses in the stream are likely to replace entries previously allocated for earlier addresses in the stream, to avoid evicting data not associated with that stream from the given level of cache. This tends to improve performance. The predetermined fraction of cache capacity can be arbitrarily chosen by a system designer, but can for example be an eighth, a quarter or a half of cache capacity, say, so as to leave the remaining portion of cache capacity available for other data not from the given stream.

Another example of the at least one stream property may be a prefetch rate for the given stream. Hence, the prefetch circuitry and/or cache control circuitry may set the cache policy information for the at least one prefetched cache entry to a value dependent on a prefetch rate with which prefetch requests are generated for the given stream of addresses. Again, the prefetch rate can be a proxy for reuse distance since if a particular stream is generating a high frequency of prefetch requests it is likely that there is a greater frequency of cache replacements making it less likely that once the stream is encountered again the cache entry for a given address in that stream is still resident in a given level of cache. Therefore, it can be useful to control cache policy information for a prefetched entry based on the prefetch rate for a corresponding stream of addresses.

The prefetch circuitry and/or the cache control circuitry may set the cache policy information for the at least one prefetched cache entry to provide at least one of: (i) a probability of the at least one prefetched cache entry being replaced in the given level of cache which increases with increasing prefetch rate for the given stream of addresses; and (ii) a probability of data evicted from the at least one prefetched cache entry being allocated to the further level of cache which decreases with increasing prefetch rate for the given stream of addresses. For busy streams of addresses generating a lot of prefetches, the reuse distance between successive accesses to the same address is more likely to be high, so the benefit of retaining an entry with cached data for that stream in the given level of cache, or of allocating the data for that stream to a further level of cache, may be lower. Therefore, it is useful for the probability of replacement in the given level of cache to increase with increasing prefetch rate, and/or the probability of allocation to the further level of cache to decrease with increasing prefetch rate.

Similar to the stream length example discussed above, in some examples where probability of allocation to a further level of cache is reduced with increasing prefetch rate, the probability of allocation in any further level of cache may be reduced to zero for some streams with a higher prefetch rate. For example, for streams with a prefetch rate above a certain threshold, if the data being evicted from the given level of cache is clean, a dataless eviction can be performed where the data is not allocated to any further level of cache.

In some examples, only one of the prefetch stream length and prefetch rate may be used to control the cache policy information.

However, in other examples, the prefetch circuitry and/or the cache control circuitry may set the cache policy information for the at least one prefetched cache entry to a value dependent on both a length of the given stream of addresses and a prefetch rate with which prefetch requests are generated for the given stream of addresses. By considering both prefetch rate and prefetch stream length, a better prediction of reuse distance can be made, leading to cache policy information being set that is more likely to lead to an improvement in performance by improving the cache hit rate for demand accesses.

There can be a number of ways in which the prefetch rate and/or prefetch stream length can be used to set the cache policy information. For example, thresholds may be defined for the prefetch rate and/or stream length, and when the rate and/or length increases beyond a corresponding threshold, then this may trigger switching to a different cache policy information setting for the prefetched cache entries allocated in the given level of cache for that stream. In some examples, the prefetch rate and prefetch stream length could be combined into a single metric which is thresholded to determine the cache policy setting to use. Alternatively, the criteria based on prefetch rate and stream length could be applied alternately, e.g. with both properties being thresholded independently, and then selecting between the resulting cache policy settings derived from each stream property, e.g. according to some order of priority, or by selecting the setting which gives the highest probability of replacement in the given level of cache, or by selecting the setting which gives the lowest probability of allocation in the further level of cache. Hence, it will be appreciated that the can be a wide variety of ways in which stream properties can be used to select the cache policy information for the prefetched cache entry.

In one example, the cache policy information, which is set based on the at least one stream property for the given stream of addresses, comprises replacement priority information indicative of a relative priority of an associated cache entry for replacement when a new entry is to be allocated in the given level of cache. For example, the replacement priority information could be a "transient" flag indicating that an entry is predicted to be transient (i.e. not likely to be accessed again) and so should be prioritised for eviction when an entry needs to be replaced to make way for a newly allocated cache entry. Alternatively, the replacement priority information could be an indication of relative age of the associated cache entry. For example, in a least recently used (LRU) or re-reference interval prediction (RRIP) replacement policy, each cache entry may be associated with an indicator which indicates the relative priority for eviction. The at least one stream property of prefetched stream of addresses may be used to select the insertion point in the priority range at which prefetched entries for that stream are allocated (e.g. entries for longer streams or streams with higher prefetch rate may be inserted at the higher end of the priority range (with the replacement priority information indicating increased priority for replacement) while entries for shorter streams or streams with lower prefetch rate may have the replacement priority information inserted with a value indicating a lower priority for replacement.

The cache policy information, which is set based on the at least one stream property for the given stream of addresses, could also comprise allocation policy information indicative of at least one of: a further level of cache to which data from an associated cache entry is to be allocated when evicted from the given level of cache; and whether the data from the associated cache entry is to be allocated to any further level of cache when evicted from the given level of cache. Hence, information may be set in the given level of cache which controls, on eviction from the given level of cache, whether to make an allocation into a further level of cache at all, and/or if an allocation into a further level of cache is made, which further level should be allocated with the data. For longer streams of addresses, or streams with high prefetch rates, it may be that the next level of cache after the given level cache is also unlikely to give a performance benefit if the data from that prefetch stream is allocated into that next level of cache, and so it can be useful to set the allocation policy information to indicate that either no further allocation should be made at all or that the next level of cache should be skipped and the allocation should be performed into a further level of cache after the next level of cache.

The prefetch circuitry and the cache control circuitry may select, based on the at least one stream property, one of a plurality of initial values to be specified for the cache policy information associated with the at least one prefetched cache entry. Hence, an initial value of the cache policy information for a prefetched entry may be selected based on the at least one stream property, at the time of allocating a new entry into the cache for the data prefetched for a given stream of addresses. After that initial allocation, the cache policy information may subsequently change, for example based on a demand access request hitting in that entry, or based on cache policy information (such as information indicating a relative age, or replacement priority, of the entry relative to other entries) being updated following subsequent allocations into the cache. Such subsequent updates to the cache policy information made after the initial allocation need not be based on the at least one stream property tracked by the prefetch circuitry, but can be controlled by the cache control circuitry based on other information on cache access patterns and replacements being made in the given level of cache. Nevertheless, it is useful to dynamically set the initial cache policy information for a prefetched cache entry based on the at least one stream property.

Note that, as a result of dynamically setting the cache policy information for at least one prefetched cache entry based on at least one stream property, this means that prefetched cache entries allocated for different streams of addresses may have different initial values of the cache policy information. This differs from alternative techniques which may allocate every prefetched cache entry with the same initial value of the cache policy information (which might differ from an initial value of cache policy information allocated for non-prefetched entries allocated in response to demand accesses made by processing circuitry, but which is the same for each prefetched entry). With the approach discussed below, although the initial value of cache policy information for a prefetched cache entry allocated following a prefetch request may still differ from the initial value of cache policy information for a non-prefetched cache entry, there can be further variation in the initial value of the cache policy information for prefetched cache entries associated with different streams of addresses, if those streams have different stream properties (e.g. different prefetch rate and/or different stream length).

In one example, the plurality of initial values include at least two of:
  a first initial value indicative of the at least one prefetched cache entry having a given priority for replacement and that on eviction of data from the at least one prefetched cache entry of the given level of cache, the evicted data should be allocated to a next level of cache;
  a second initial value indicative of the at least one prefetched cache entry having a higher priority for replacement than indicated by the first initial value, and that on eviction of data from the at least one prefetched cache entry of the given level of cache, the evicted data should be allocated to a next level of cache;
  a third initial value indicative of the at least one prefetched cache entry having a higher priority for replacement than indicated by the first initial value, and that on eviction of data from the at least one prefetched cache entry of the given level of cache, the evicted data should be allocated to a higher level of cache bypassing allocation in the next level of cache; and
  a fourth initial value indicative of the at least one prefetched cache entry having a higher priority for replacement than indicated by the first initial value, and that on eviction of clean data from the at least one prefetched cache entry of the given level of cache, the evicted data should not be allocated to either the next level of cache or the higher level of cache.

This provides a graduated scheme of cache policy levels which can be selected based on the stream property. It is not essential to support all of these options. Nevertheless, by providing a number of such options, greater flexibility is available for tailoring cache replacement/allocation policy based on stream properties. For example, based on stream length and/or prefetch rate, the policy could be adapted to select the first initial value for short/infrequently prefetched streams, the second initial value for streams with length and/or prefetch rate greater than a first threshold, the third initial value for streams with length and/or prefetch rate greater than a second threshold, and the fourth initial value for streams with length and/or prefetch rate greater than a third threshold. As the stream length or prefetch rate increases, the benefit of caching the data in the given level of cache or next level of cache decreases, and it can be more useful to push the data out to higher levels of cache and/or to not cache the data at all once evicted from the given level. This can help to improve performance by saving cache capacity for other information not part of that stream.

At least one of the second initial value, third initial value and fourth initial value may indicate that the at least one prefetched cache entry has a highest priority for replacement. This means that entries allocated for that stream are more likely to replace other entries previously allocated for that stream than to cause data not part of that stream to be evicted, helping to improve performance (as for a stream where the second, third or fourth initial value is selected, it is expected that reuse distance is higher so that the cache capacity can be better used for other information not part of that stream).

In one example, the stream prefetch state information may comprise stride information indicative of at least one stride offset between respective addresses of the given stream of addresses. A stride based prefetcher can be relatively simple to implement and the properties tracked for the stream such as length of the stream and stream prefetch rate can be useful for controlling cache replacement/allocation policy.

However, other examples may track streams of addresses based on other information, not necessarily a stride. For example, a region prefetcher may maintain a set of offset indications indicating offsets of addresses in the stream relative to a start address of the stream.

Stream property tracking circuitry may be provided to track the at least one stream property for the given stream of addresses. In response to detection that prefetching for the given stream of addresses is inactive for a period of duration greater than a threshold duration, the prefetch circuitry may disable the stream property tracking circuitry. This helps to save power. For example, the stream property tracking circuitry (e.g. counters or flip-flops used to track the stream length or prefetch rate, and associated circuit logic for maintaining the property information) may be placed in a power saving state when the corresponding stream is determined to be inactive.

The techniques discussed above could be applied for setting the cache policy information for any level of cache. However, they can be particularly useful where the given level of cache is a level 1 cache, as preserving level 1 cache capacity for other information not from a relatively long/busy prefetch stream can provide the greatest improvement for performance. The next level of cache can be a level 2 cache and the higher level of cache can be a level 3 cache, for example.

Figure 1:
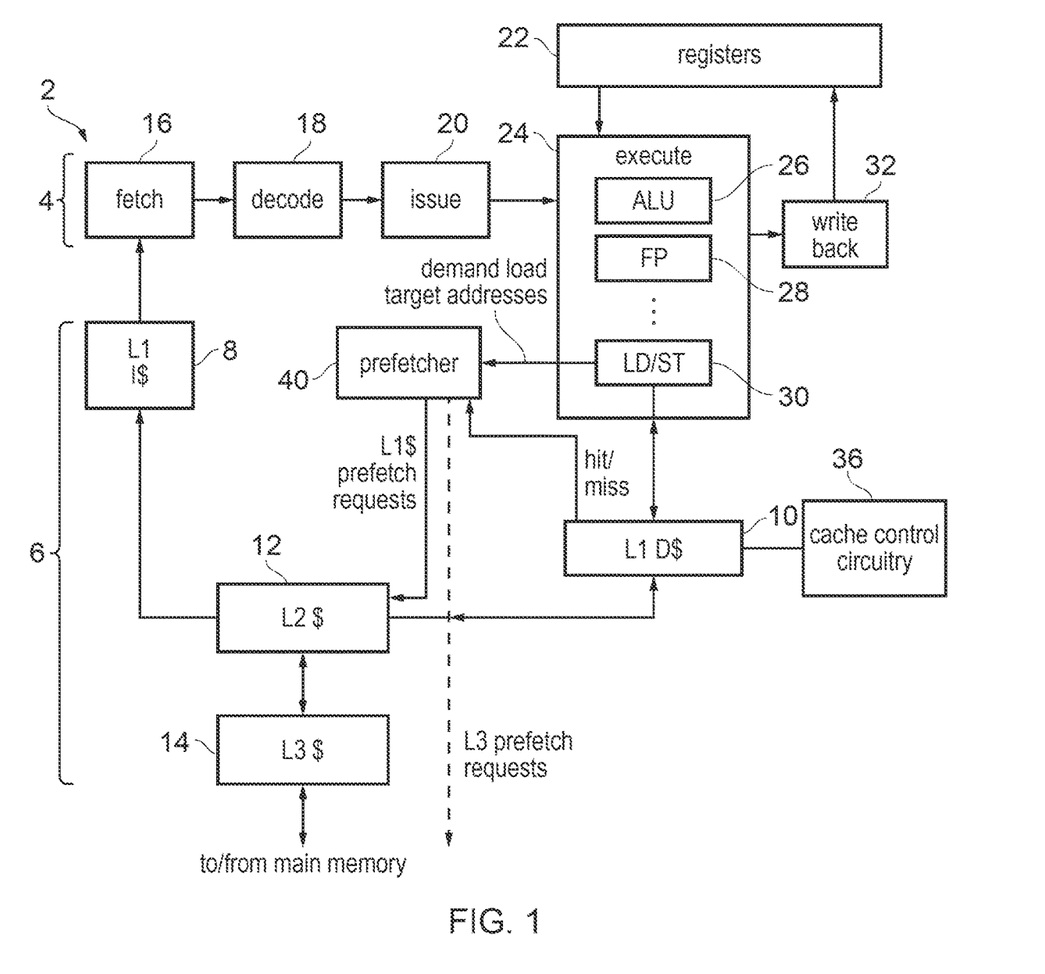
FIG. 1 schematically illustrates an example of a data processing apparatus having prefetch circuitry and cache control circuitry.

FIG. 1 illustrates an example of a data processing apparatus 2. The apparatus has a processing pipeline 4 for processing program instructions fetched from a memory system 6. The memory system in this example includes a level 1 instruction cache 8, a level 1 data cache 10, a level 2 cache 12 shared between instructions and data, a level 3 cache 14, and main memory which is not illustrated in FIG. 1 but may be accessed in response to requests issued by the processing pipeline 4. It will be appreciated that other examples could have a different arrangement of caches with different numbers of cache levels or with a different hierarchy regarding instruction caching and data caching (e.g. different numbers of levels of cache could be provided for the instruction caches compared to data caches).

The processing pipeline 4 includes a fetch stage 16 for fetching program instructions from the instruction cache 8 or other parts of the memory system 6. The fetched instructions are decoded by a decode stage 18 to identify the types of instructions represented and generate control signals for controlling downstream stages of the pipeline 4 to process the instructions according to the identified instruction types. The decode stage passes the decoded instructions to an issue stage 20 which checks whether any operands required for the instructions are available in registers 22 and issues an instruction for execution when its operands are available (or when it is detected that the operands will be available by the time they reach the execute stage 24). The execute stage 24 includes a number of functional units 26, 28, 30 for performing the processing operations associated with respective types of instructions. For example, in FIG. 1 the execute stage 24 is shown as including an arithmetic/logic unit (ALU) 26 for performing arithmetic operations such as add or multiply and logical operations such as AND, OR, NOT, etc. Also the execute unit includes a floating point unit 28 for performing operations involving operands or results represented as a floating-point number. Also the functional units include a load/store unit 30 for executing load instructions to load data from the memory system 6 to the registers 22 or store instructions to store data from the registers 22 to the memory system 6. Load requests issued by the load/store unit 30 in response to executed load instructions may be referred to as demand load requests. Store requests issued by the load/store unit 30 in response to executed store instructions may be referred to as demand store requests. The demand load requests and demand store requests may be collectively referred to as demand memory access requests. It will be appreciated that the functional units shown in FIG. 1 are just one example, and other examples could have additional types of functional units, or could have multiple functional units of the same type, or may not include all of the types shown in FIG. 1 (e.g. some processors may not have support for floating-point processing). The results of the executed instructions are written back to the registers 22 by a write back stage 32 of the processing pipeline 4.

It will be appreciated that the pipeline architecture shown in FIG. 1 is just one example and other examples could have additional pipeline stages or a different arrangement of pipeline stages. For example, in an out-of-order processor a register rename stage may be provided for mapping architectural registers specified by program instructions to physical registers identifying the registers 22 provided in hardware. Also, it will be appreciated that FIG. 1 does not show all of the components of the data processing apparatus and that other components could also be provided. For example a branch predictor may be provided to predict outcomes of branch instructions so that the fetch stage 16 can fetch subsequent instructions beyond the branch earlier than if waiting for the actual branch outcome. Also a memory management unit could be provided for controlling address translation between virtual addresses specified by the program instructions and physical addresses used by the memory system.

As shown in FIG. 1, the apparatus 2 has a prefetcher 40 for analyzing patterns of demand target addresses specified by demand memory access requests issued by the load/store unit 30, and detecting address access patterns which can subsequently be used to predict addresses of future memory accesses. For example, the address access patterns may involve stride sequences of addresses where there are a number of addresses separated at regular intervals of a constant stride value. It is also possible to detect other kinds of address access patterns (e.g. a pattern where subsequent accesses target addresses at certain offsets from a start address). The prefetcher 40 maintains prefetch state information representing the observed address access patterns (e.g. tracked as one or more streams of addresses), and uses the prefetch state information to generate prefetch load requests which are issued to the memory system 6 to request that data is brought into a given level of cache. For example, when a trigger event for a given access pattern is detected (e.g. the trigger event could be program flow reaching a certain program counter address, or an load access to a particular trigger address being detected), the prefetcher 40 may begin issuing prefetch load requests for addresses determined according to that pattern (stream). The prefetch load requests are not directly triggered by a particular instruction executed by the pipeline 4, but are issued speculatively with the aim of ensuring that when a subsequent load/store instruction reaches the execute stage 24, the data it requires may already be present within one of the caches, to speed up the processing of that load/store instruction and therefore reduce the likelihood that the pipeline has to be stalled.

The prefetcher 40 may be able to perform prefetching into a single cache or into multiple caches. For example, FIG. 1 shows an example of the prefetcher 40 issuing level 1 cache prefetch requests which are sent to the level 2 cache 12 or downstream memory and request that data from prefetch target addresses is brought into the level 1 data cache 10. Also the prefetcher in this example could also issue level 3 prefetch requests to the main memory requesting that data from prefetch target addresses is loaded into the level 3 cache 14. The level 3 prefetch request may look a longer distance into the future than the level 1 prefetch requests to account for the greater latency expected in obtaining data from main memory into the level 3 cache 14 compared to obtaining data from a level 2 cache into the level 1 cache 10. In systems using both level 1 and level 3 prefetching, the level 3 prefetching can increase the likelihood that data requested by a level 1 prefetch request is already in the level 3 cache. However it will be appreciated that the particular caches loaded based on the prefetch requests may vary depending on the particular circuit of implementation.

As shown in FIG. 1, as well as the demand target addresses issued by the load/store unit 30, the training of the prefetcher 40 may also be based on an indication of whether the corresponding demand memory access requests hit or miss in the level 1 data cache 10. The hits/miss indication can be used for filtering the demand target addresses from training. This recognises that it is not useful to expend prefetch resource on addresses for which the demand target addresses would anyway hit in the cache. Performance improvement can be greater in focusing prefetcher training on those addresses which, in the absence of prefetching, would have encountered cache misses for the demand access requests.

Figure 2:
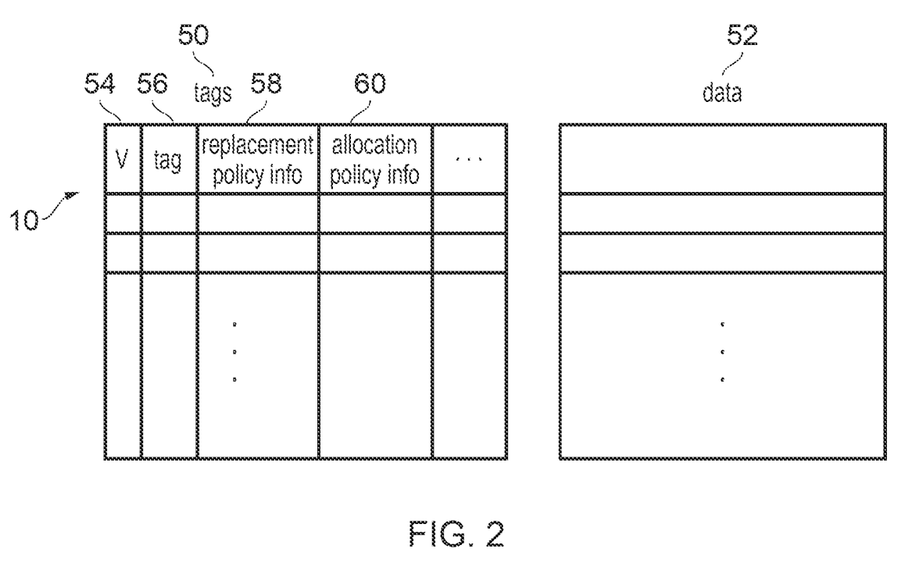
FIG. 2 illustrates an example of cache policy information associated with cache entries of a cache.

Cache control circuitry 36 is provided to control replacement of cache entries in a given level of cache (e.g. the level 1 data cache 10 in this example) and/or allocation of cache entries evicted from a given level of cache to a further level of cache, such as the level 2 cache 12 or the level 3 cache 14. FIG. 2 illustrates an example of cache policy information 58, 60 that can be used to control the replacement and/or allocation of cache entries in the given level of cache 10.

As shown in FIG. 2, a given level of cache 10 stores, for each entry, the data for a given cache line having a given memory address, and associated metadata used to control access to the corresponding entry and its replacement and allocation to further levels of cache. In this example, the metadata is stored in a tag storage array 50 and the data is stored in a separate data storage array 52, but other examples could store the metadata in the same storage array as the data itself. Hence, more generally, the cache associates each data entry with an associated item of metadata, but the particular storage location for the metadata can vary.

The metadata for a given cache entry includes, for example:
  a valid indicator 54 indicating whether the corresponding cache entry is valid or invalid.
  an address tag value 56 derived from the address of the data in the corresponding cache entry, which is used on a lookup of the cache to determine whether the data in the corresponding cache entry corresponds to a lookup address for which cached data is sought.
  replacement policy information 58 used to control replacement of cache entries when a new entry for a given address needs to be allocated to the cache and there is no available invalid entry which can be allocated for the given address (some cache implementations may use a set-associative allocation policy where a given address can be allocated to entries in a limited set of entries selected based on the given address, rather than being able to be allocated to any entry). For example, the replacement policy information 58 could be a re-reference interval prediction (RRIP) value indicating a relative priority for replacement, an "age" value indicating relative age since last access to the entry, or a flag indicating whether the entry is "transient" and should be prioritised for eviction over other "non-transient" entries. Any known replacement policy scheme can be used to maintain the replacement policy information. For example, with a RRIP scheme, newly allocated entries may have a certain initial value of the RRIP replacement policy information 58. On a hit in an entry, the RRIP value of that entry may either be incremented to a value representing the next lowest priority for replacement or set to the value representing the lowest priority for replacement. On a miss in the cache causing allocation of a new entry into the cache, the RRIP values for all the other entries in the set to which the new entry could be allocated may be adjusted to increase the priority of replacement of those entries. Other replacement policies can also be used, so RRIP is just one example.
  allocation policy information 60 used to control whether to allocate data evicted from the corresponding cache entry into a further level of cache, and if so, which further level the data should be allocated to. For example, the allocation policy information 16 may specify whether, when the data from a given entry in the level one cache 10 is evicted, that data should be allocated to the level 2 cache 12, the level 3 cache 14, or to neither the level 2 cache 12 nor the level 3 cache 14.

Figure 3:
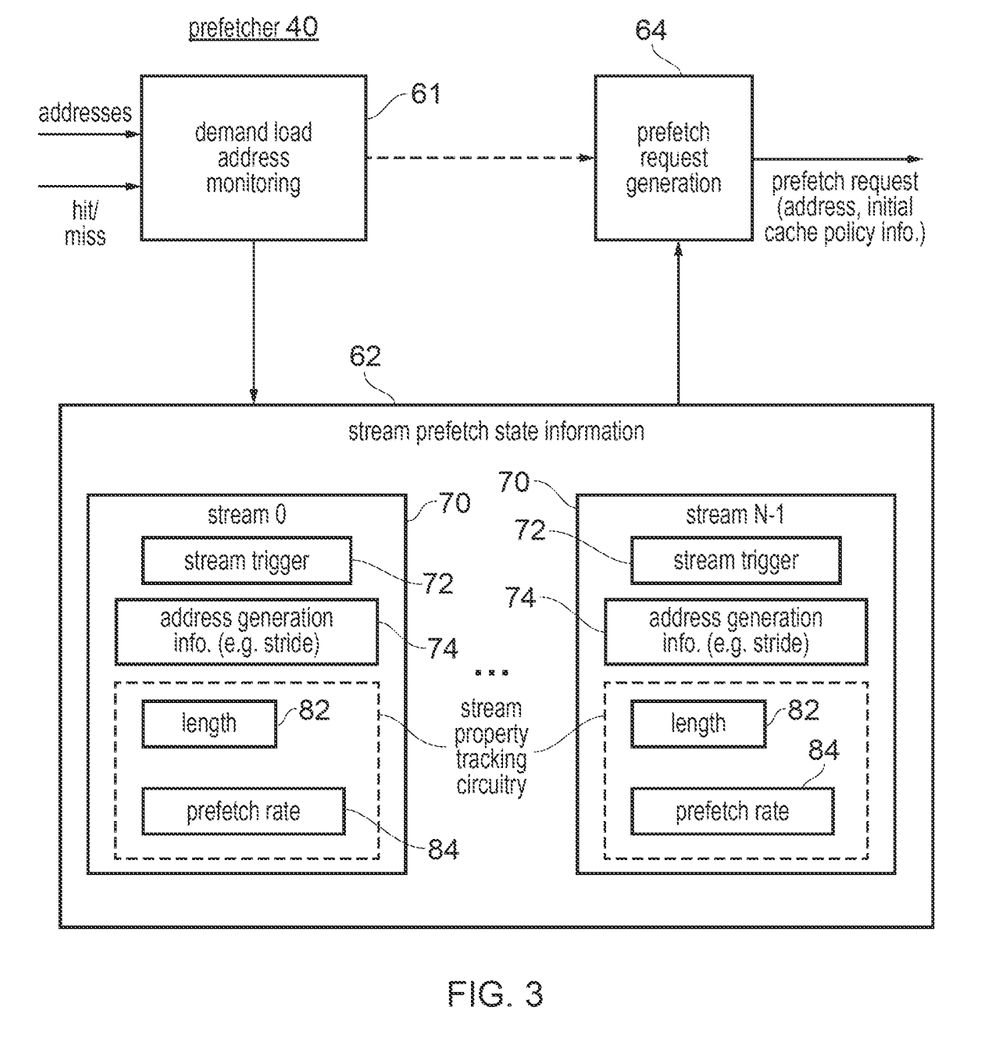
FIG. 3 illustrates an example of maintaining stream prefetch state information and stream properties for a number of streams of addresses.

FIG. 3 illustrates an example of the prefetcher 40 in more detail. The prefetcher includes demand load address monitoring circuitry 61 for monitoring the addresses of demand load accesses and the hit/miss information resulting from those accesses, to maintain, based on that monitoring, stream prefetch state information 62 representing a number of streams of addresses. The stream prefetch state information 62 provides, for each stream, information representing an address access pattern for generating addresses to be specified by a corresponding series of prefetch requests.

For example, a set of stream prefetch state information 70 for a given stream may indicate stream trigger information 72 representing a trigger event in response to which the prefetcher 40 should generate prefetch requests for the corresponding stream. For example the stream trigger information 72 may define a program counter address, so that when program flow reaches an instruction corresponding to the program counter address represented as the stream trigger information, prefetch requests may be generated for the corresponding stream. In another example, the stream trigger information 72 may define a trigger load target address, so that when the processing circuitry 24 issues a load request specifying that trigger load target address, subsequent prefetches are generated for the corresponding stream.

The stream prefetch state information 70 for the given stream may also indicate address generation information 74 used to generate the addresses to be specified by the prefetch requests generated for the corresponding stream. For example, the address generation information could specify a stride value, or a set of stride values, representing differences between successive addresses in the stream. Alternatively, the address generation information could specify a set of offsets relative to a start address of the stream, used to derive the addresses of subsequent prefetch requests for the stream.

Based on the stream prefetch state information 70 for a given stream, prefetch request generation circuitry 64 generates a corresponding set of prefetch requests, which specify an address of data to be prefetched to a given level of cache, e.g. the level 1 data cache 10.

The stream prefetch state information 70 may also include at least one stream property tracked by stream property tracking circuitry 80, which in this example includes a prefetch stream length 82 and a prefetch rate 84. While these stream properties are shown as part of the stream prefetch state 70 for a given stream in the example of FIG. 3, they could also be tracked separately from the stream prefetch state information used to generate the prefetch requests.

The stream length 82 indicates the length of the stream, e.g. indicating the maximum number of prefetch requests generated for the stream. This can be obtained during training of the stream prefetch state information, based on the number of demand load accesses detected (following the stream trigger event) as following the pattern represented by the stream prefetch state information until there are no more demand loads that follow that pattern. The stream length 82 could also continue to be monitored once the stream state information 70 is used for generation of prefetch requests, in case there is a change of behaviour since the training was performed. For example, the stream property tracking circuitry 80 may maintain a length counter which is incremented when a further demand load is seen for a pattern which causes the stream to extend beyond the length currently indicated by the length counter.

The prefetch rate 84 indicates the rate (frequency) of prefetch requests generated for a given stream. The rate of prefetch request generation may depend, for example, on the rate at which corresponding demand loads are being issued by the processing circuitry 24. For example, for a stride access pattern, the prefetcher 40 could issue prefetch requests for a certain distance ahead of the addresses reached by the demand address stream, so if the demand access requests for that stream are being issued more frequently than the corresponding prefetch request will also become more frequent. Hence, the stream property tracking circuitry 80 may have counters to count the number of prefetch requests generated for a given stream. This may be tracked over a number of cycle-based windows of time, with decay of old rate information at the end of a window so that the information tracked longer ago in time gradually reduces in influence and the information on prefetches generated more recently may be more influential in the overall rate indicated by the prefetch rate metric 84.

It is not essential for the stream properties tracked by the stream property tracking circuitry 8 to be used for the generation of prefetch request, although this is still possible (e.g. the stream length 82 may be used to ensure that prefetch requests are not generated beyond the length previously seen for the stream).

However, in the examples discussed below, stream properties 82, 84 tracked by the stream property tracking circuitry 80 can be used to control the initial value set for the cache policy information (e.g. replacement policy information 58 and/or allocation policy information 60) set for entries allocated in a given level of cache 10 in response to the prefetch requests generated for that stream. For example, as shown in FIG. 3, the prefetch request generation circuitry 64 may determine initial cache policy information based on the stream property 82, 84 of the relevant stream, and the initial cache policy information may be supplied to the cache 10 (or the cache control circuitry 36) along with the prefetch request, so that that cache policy information can be set in the relevant fields 58, 60 of the prefetched cache entry allocated in the cache 10 for that prefetch request. Alternatively, in other examples the prefetcher 40 may supply values of the stream properties 82, 84 and the determination of the corresponding cache policy information can be made by the cache 10 or the cache control circuitry 36.

Hence, a dynamic replacement and allocation policy is applied based on prefetch stream length and/or rate: Based on the length of a prefetch stream, and/or the rate of prefetches, the replacement policy for cache lines brought in as part of that stream can be adjusted, as well as adjusting the allocation policy in downstream caches of those lines upon eviction. Hence, the prefetcher 40 keeps track of the length of various prefetch streams (e.g. how many L1D prefetches have been performed on a given stream), as well as the rate at which prefetches are being generated, and these metrics are used (e.g. by combining into a single metric) to influence policy for selecting the initial value to be specified for the cache policy information 58, 60 according to one of a number of options.

Figure 4:
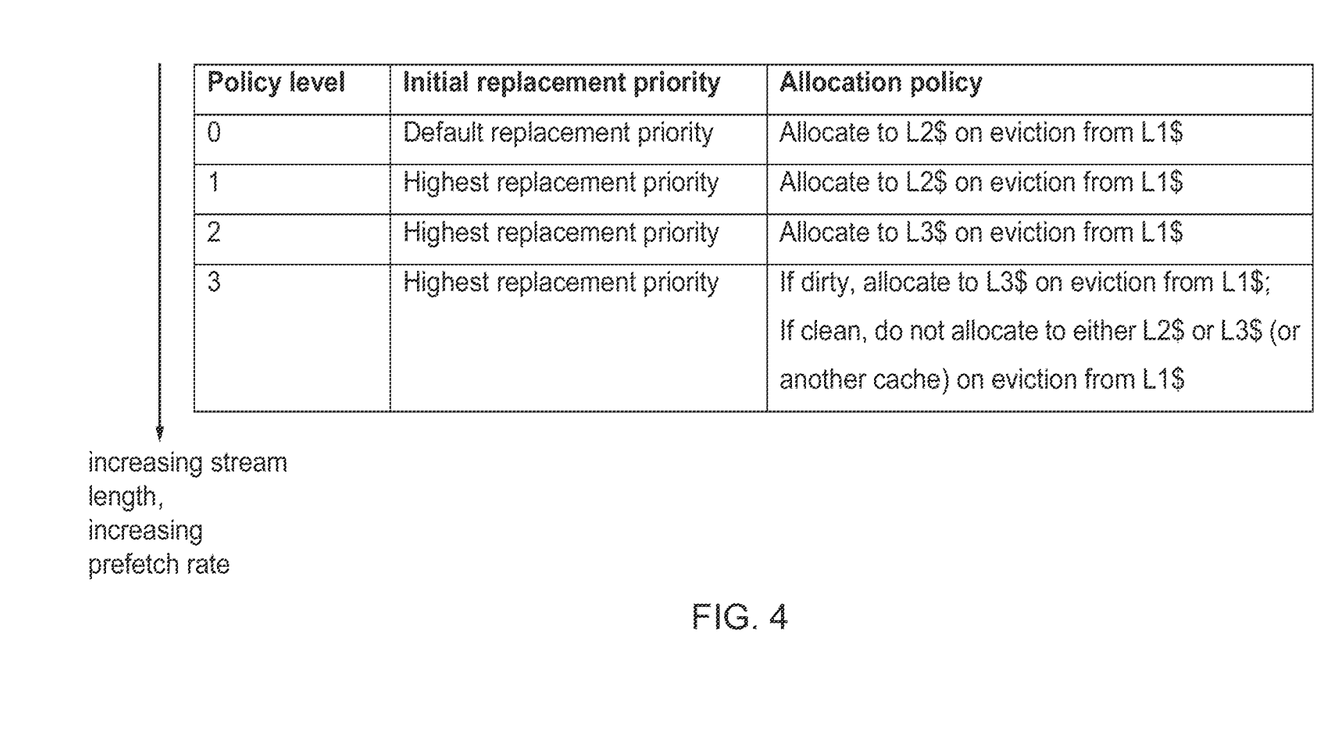
FIG. 4 illustrates a number of replacement/allocation policy levels which can be selected for a prefetched cache entry based on at least one stream property of a corresponding stream of addresses.

FIG. 4 shows an example of a number of cache policy levels which can be selected based on the stream property (length and/or prefetch rate). For example, the cache policy levels may include:

Level 0: initial replacement priority is a certain default value (e.g. a value other than the highest replacement priority), and on eviction from L1 cache 10 the prefetched line is to be allocated to the L2 cache 12. This may, for example, be the normal allocation and replacement policy also used for non-prefetched lines, or could be an allocation/replacement policy used for prefetched data, different from the policy used for demand allocations of data pulled into the L1 cache 10 when a demand access misses.

Level 1: prefetched L1 lines are marked as transient by indicating the highest replacement priority (line is preferred for L1 data cache eviction), but on eviction from L1 cache 10, the line is still allocated to L2 cache 12 (e.g. with L2 replacement policy information indicating the highest priority for eviction from the L2 cache).

Level 2: prefetched L1 lines are marked as transient by indicating the highest replacement priority (line is preferred for L1 data cache eviction), but on eviction from L1 cache 10 the line skips L2 allocation, and allocates in L3 cache 14 (e.g. with L3 replacement policy information indicating the highest priority for eviction from the L3 cache).

Level 3: prefetched L1 lines are marked as transient by indicating the highest replacement priority (line is preferred for L1 data cache eviction), but on eviction from L1 cache 10, if the line is clean then no allocation into either L2 or L3 cache 12, 14 (or any other cache) is performed. Hence, in the case of clean data with policy level 3, a dataless eviction is performed from the L1 cache, i.e. the data is simply discarded from the L1 cache without being allocated to any further cache. With policy level 3, if the data evicted from the L1 cache is dirty, then the line is allocated to the L3 cache 14, the same as at policy level 2.

As shown in FIG. 4, with increasing stream length, the initial cache policy information 58, 60 for the prefetched entry may be set according to successively increasing policy levels. Similarly, with increasing stream prefetch rate, the initial cache policy information 58, 60 for the prefetched entry may be set according to successively increasing policy levels. For example, thresholds may be set by the system designer, and the stream length or prefetch rate can be compared with such thresholds to determine which policy level to select. The thresholds may be chosen so that the switch from policy level 0 to policy level 1 occurs when the stream length and prefetch rate is such that allocating all the addresses from that prefetch stream to the level 1 cache is likely to require more than a certain fraction (e.g. a quarter, or a half) of level 1 cache capacity. The particular values for such thresholds can be chosen arbitrarily by a system designer based on the cache capacity, number of levels, and expected needs of the system, so will vary significantly from one implementation to another.

If both stream length and prefetch rates are used, these can be combined into a single metric, for example by multiplying stream length by prefetch rate (or an equivalent function which may be simpler to implement in hardware, such as by left shifting a score value representing one of the stream length/prefetch rate by a number of bits depending on the other of stream length/prefetch rate). It may also be possible to threshold the stream length and the prefetch rate independently, to separately select a policy level based on each stream property, and then to use the "higher numbered" policy level (i.e. the policy which gives the greatest priority for eviction from the given level or cache and/or the lowest priority for allocation into a given further level of cache) among the policy levels selected for the different stream properties.

By selecting the replacement/allocation policy to use for the prefetched cache entry based on stream length and/or prefetch rate, this can provide a proxy for estimated reuse distance so that a better prediction of which addresses may be needed again in future. This allows the available cache capacity of the cache hierarchy to be more efficiently utilised, reducing the chance that a large fraction of level 1 cache capacity is allocated for long streams or frequently-prefetching streams, saving cache capacity for other addresses which are more likely to be accessed again in the near future. Also, this can help to reduce traffic between caches to allow inter-cache traffic bandwidth to be conserved for other traffic which is more likely to be benefit performance, as well as saving power. For example, if it is determined, based on stream length and/or prefetch rate, that level 2 cache allocation should be skipped and a line evicted from level 1 to be allocated into the level 3 cache, this can avoid useless movement of the line from level 1 to level 2 and subsequently from level 2 to level 3, which allows us to save power and bandwidth between cache levels.

Figure 5:
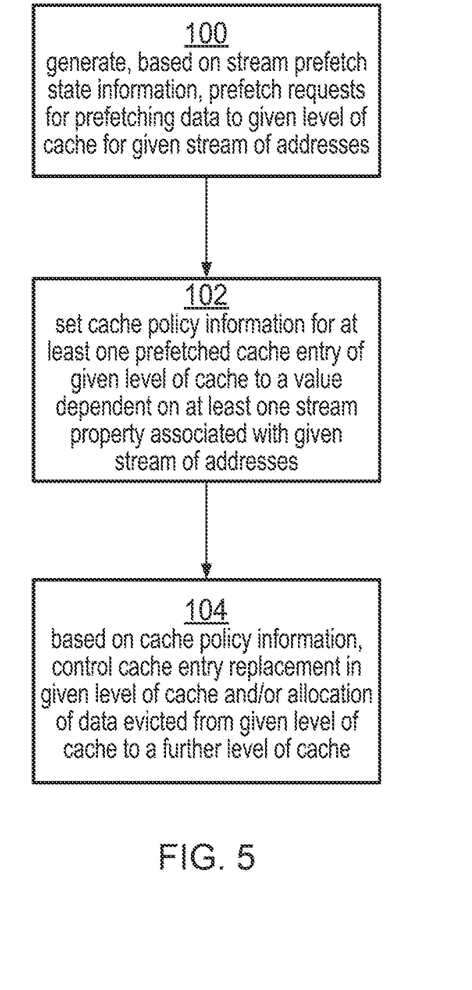
FIG. 5 illustrates a method of setting cache policy information for at least one prefetched cache entry based on at least one stream property.

FIG. 5 illustrates a method of controlling cache policy information based on prefetch stream properties. At step 100, the prefetch circuitry 40 generates prefetch requests based on stream prefetch state information. The prefetch requests request prefetching of data to a given level of cache (e.g. level 1 cache 10) for a given stream of addresses. Each stream of addresses tracked by the prefetch circuitry 40 is associated with corresponding stream prefetch state information identifying an address pattern used to generate a corresponding series of prefetch requests.

At step 102, cache policy information 58, 60 for at least one prefetched cache entry (allocated with data prefetched according to the prefetch requests generated for a given stream of addresses at step 100) is set, by the prefetch circuitry 40 and/or the cache control circuitry 36, depending on at least one stream property 82, 84 associated with the given stream of addresses. For example, the stream length and/or prefetch rate for the given stream may be used to select the initial value of the cache policy information set for at least one prefetched cache entry.

At step 104, the cache control circuitry 36 uses the cache policy information to control cache entry replacement in the given level of cache 10 and/or allocation of data evicted from a given level of cache 10 to a further level of cache 12, 14.

In some examples, the prefetch circuitry 40 may monitor the activity of each stream, and mark a stream as "inactive" when the prefetch circuitry 40 stops prefetching for that stream for a time window of duration greater than a given threshold. If a stream becomes inactive, the stream property tracking circuitry 80 (e.g. counters or flip flops used to track the stream properties 82, 84, and associated control logic) can be disabled (placed in a power saving state), to save power.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

1. An apparatus comprising:
   prefetch circuitry to generate, based on stream prefetch state information, prefetch requests for prefetching data to at least one cache; and
   cache control circuitry to control, based on cache policy information associated with cache entries in a given level of cache, at least one of:
      cache entry replacement in the given level of cache; and
      allocation of data evicted from the given level of cache to a further level of cache;
   in which:
      the stream prefetch state information specifies, for at least one stream of addresses, information representing an address access pattern for generating addresses to be specified by a corresponding series of prefetch requests; and
      at least one of the prefetch circuitry and the cache control circuitry is configured to control the cache policy information associated with at least one prefetched cache entry of the given level of cache to which data is prefetched for a given stream of addresses, to set the cache policy information for the at least one prefetched cache entry to a value dependent on at least one stream property associated with the given stream of addresses.

2. The apparatus according to clause 1, in which said at least one of the prefetch circuitry and the cache control circuitry is configured to set the cache policy information for the at least one prefetched cache entry to a value dependent on a length of the given stream of addresses.

3. The apparatus according to clause 2, in which said at least one of the prefetch circuitry and the cache control circuitry is configured to set the cache policy information for the at least one prefetched cache entry to provide at least one of:
   a probability of the at least one prefetched cache entry being replaced in the given level of cache which increases with increasing length of the given stream of addresses; and
   a probability of data evicted from the at least one prefetched cache entry being allocated to the further level of cache which decreases with increasing length of the given stream of addresses.

4. The apparatus according to any of clauses 2 and 3, in which said at least one of the prefetch circuitry and the cache control circuitry is configured to set the cache policy information for the at least one prefetched cache entry to indicate a highest priority for replacement in the given level of cache when the length of the given stream of addresses is sufficiently long that a number of cache entries of the given level of cache that would be required to accommodate data for each address in the given stream would exceed a predetermined fraction of cache capacity of the given level of cache.

5. The apparatus according to any of clauses 1 to 4, in which said at least one of the prefetch circuitry and the cache control circuitry is configured to set the cache policy information for the at least one prefetched cache entry to a value dependent on a prefetch rate with which prefetch requests are generated for the given stream of addresses.

6. The apparatus according to clause 5, in which said at least one of the prefetch circuitry and the cache control circuitry is configured to set the cache policy information for the at least one prefetched cache entry to provide at least one of:
   a probability of the at least one prefetched cache entry being replaced in the given level of cache which increases with increasing prefetch rate for the given stream of addresses; and
   a probability of data evicted from the at least one prefetched cache entry being allocated to the further level of cache which decreases with increasing prefetch rate for the given stream of addresses.

7. The apparatus according to any of clauses 1 to 6, in which said at least one of the prefetch circuitry and the cache control circuitry is configured to set the cache policy information for the at least one prefetched cache entry to a value dependent on both a length of the given stream of addresses and a prefetch rate with which prefetch requests are generated for the given stream of addresses.

8. The apparatus according to any of clauses 1 to 7, in which the cache policy information, which is set based on the at least one stream property for the given stream of addresses, comprises replacement priority information indicative of a relative priority of an associated cache entry for replacement when a new entry is to be allocated in the given level of cache.

9. The apparatus according to any of clauses 1 to 8, in which the cache policy information, which is set based on the at least one stream property for the given stream of addresses, comprises allocation policy information indicative of at least one of:
   a further level of cache to which data from an associated cache entry is to be allocated when evicted from the given level of cache; and
   whether the data from the associated cache entry is to be allocated to any further level of cache when evicted from the given level of cache.

10. The apparatus according to any of clauses 1 to 9, in which said at least one of the prefetch circuitry and the cache control circuitry is configured to select, based on the at least one stream property, one of a plurality of initial values to be specified for the cache policy information associated with the at least one prefetched cache entry.

11. The apparatus according to clause 10, in which the plurality of initial values include at least two of:
   a first initial value indicative of the at least one prefetched cache entry having a given priority for replacement and that on eviction of data from the at least one prefetched cache entry of the given level of cache, the evicted data should be allocated to a next level of cache;
   a second initial value indicative of the at least one prefetched cache entry having a higher priority for replacement than indicated by the first initial value, and that on eviction of data from the at least one prefetched cache entry of the given level of cache, the evicted data should be allocated to a next level of cache;
   a third initial value indicative of the at least one prefetched cache entry having a higher priority for replacement than indicated by the first initial value, and that on eviction of data from the at least one prefetched cache entry of the given level of cache, the evicted data should be allocated to a higher level of cache bypassing allocation in the next level of cache; and a fourth initial value indicative of the at least one prefetched cache entry having a higher priority for replacement than indicated by the first initial value, and that on eviction of clean data from the at least one prefetched cache entry of the given level of cache, the evicted data should not be allocated to either the next level of cache or the higher level of cache.

12. The apparatus according to clause 11, in which at least one of the second initial value, third initial value and fourth initial value indicates that the at least one prefetched cache entry has a highest priority for replacement.

13. The apparatus according to any of clauses 1 to 12, in which the stream prefetch state information comprises stride information indicative of at least one stride offset between respective addresses of the given stream of addresses.

14. The apparatus according to any preceding clause, comprising stream property tracking circuitry to track the at least one stream property for the given stream of addresses; in which:
in response to detection that prefetching for the given stream of addresses is inactive for a period of duration greater than a threshold duration, the prefetch circuitry is configured to disable the stream property tracking circuitry.

15. The apparatus according to any preceding clause, in which the given level of cache is a level 1 cache.

16. A non-transitory storage medium storing computer-readable code for fabrication of an apparatus comprising:
prefetch circuitry to generate, based on stream prefetch state information, prefetch requests for prefetching data to at least one cache; and
cache control circuitry to control, based on cache policy information associated with cache entries in a given level of cache, at least one of:
  cache entry replacement in the given level of cache; and
  allocation of data evicted from the given level of cache to a further level of cache;
in which:
  the stream prefetch state information specifies, for at least one stream of addresses, information representing an address access pattern for generating addresses to be specified by a corresponding series of prefetch requests; and
  at least one of the prefetch circuitry and the cache control circuitry is configured to control the cache policy information associated with at least one prefetched cache entry of the given level of cache to which data is prefetched for a given stream of addresses, to set the cache policy information for the at least one prefetched cache entry to a value dependent on at least one stream property associated with the given stream of addresses.

17. A method comprising:
generating, based on stream prefetch state information, prefetch requests for prefetching data to at least one cache; and
controlling, based on cache policy information associated with cache entries in a given level of cache, at least one of:
  cache entry replacement in the given level of cache; and
  allocation of data evicted from the given level of cache to a further level of cache;
in which:
  the stream prefetch state information specifies, for at least one stream of addresses, information representing an address access pattern for generating addresses to be specified by a corresponding series of prefetch requests; and
  the method comprises controlling the cache policy information associated with at least one prefetched cache entry of the given level of cache to which data is prefetched for a given stream of addresses, to set the cache policy information for the at least one prefetched cache entry to a value dependent on at least one stream property associated with the given stream of addresses.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
prefetch circuitry to generate, based on stream prefetch state information, prefetch requests for prefetching data to at least one cache; and
cache control circuitry to control, based on cache policy information associated with cache entries in a given level of cache, at least one of:
  cache entry replacement in the given level of cache; and
  allocation of data evicted from the given level of cache to a further level of cache; in which:
the stream prefetch state information specifies, for at least one stream of addresses, information representing an address access pattern for generating addresses to be specified by a corresponding series of prefetch requests;
at least one of the prefetch circuitry and the cache control circuitry is configured to control the cache policy information associated with at least one prefetched cache entry of the given level of cache to which data is prefetched for a given stream of addresses, to set the cache policy information for the at least one prefetched cache entry to a value dependent on at least one stream property associated with the given stream of addresses; and said at least one of the prefetch circuitry and the cache control circuitry is configured to set the cache policy information for the at least one prefetched cache entry to a value dependent on a length of the given stream of addresses.

2. The apparatus according to claim 1, in which said at least one of the prefetch circuitry and the cache control circuitry is configured to set the cache policy information for the at least one prefetched cache entry to provide at least one of:
  a probability of the at least one prefetched cache entry being replaced in the given level of cache which increases with increasing length of the given stream of addresses; and
  a probability of data evicted from the at least one prefetched cache entry being allocated to the further level of cache which decreases with increasing length of the given stream of addresses.

3. The apparatus according to claim 1, in which said at least one of the prefetch circuitry and the cache control circuitry is configured to set the cache policy information for the at least one prefetched cache entry to indicate a highest priority for replacement in the given level of cache when the length of the given stream of addresses is sufficiently long that a number of cache entries of the given level of cache that would be required to accommodate data for each address in the given stream would exceed a predetermined fraction of cache capacity of the given level of cache.

4. An apparatus comprising:
  prefetch circuitry to generate, based on stream prefetch state information, prefetch requests for prefetching data to at least one cache; and
  cache control circuitry to control, based on cache policy information associated with cache entries in a given level of cache, at least one of:
    cache entry replacement in the given level of cache; and
    allocation of data evicted from the given level of cache to a further level of cache; in which:
  the stream prefetch state information specifies, for at least one stream of addresses, information representing an address access pattern for generating addresses to be specified by a corresponding series of prefetch requests;
  at least one of the prefetch circuitry and the cache control circuitry is configured to control the cache policy information associated with at least one prefetched cache entry of the given level of cache to which data is prefetched for a given stream of addresses, to set the cache policy information for the at least one prefetched cache entry to a value dependent on at least one stream property associated with the given stream of addresses; and
  said at least one of the prefetch circuitry and the cache control circuitry is configured to set the cache policy information for the at least one prefetched cache entry to a value dependent on a prefetch rate with which prefetch requests are generated for the given stream of addresses.

5. The apparatus according to claim 4, in which said at least one of the prefetch circuitry and the cache control circuitry is configured to set the cache policy information for the at least one prefetched cache entry to provide at least one of:
  a probability of the at least one prefetched cache entry being replaced in the given level of cache which increases with increasing prefetch rate for the given stream of addresses; and
  a probability of data evicted from the at least one prefetched cache entry being allocated to the further level of cache which decreases with increasing prefetch rate for the given stream of addresses.

6. The apparatus according to claim 1, in which said at least one of the prefetch circuitry and the cache control circuitry is configured to set the cache policy information for the at least one prefetched cache entry to a value dependent on both a length of the given stream of addresses and a prefetch rate with which prefetch requests are generated for the given stream of addresses.

7. The apparatus according to claim 1, in which the cache policy information, which is set based on the at least one stream property for the given stream of addresses, comprises replacement priority information indicative of a relative priority of an associated cache entry for replacement when a new entry is to be allocated in the given level of cache.

8. The apparatus according to claim 1, in which the cache policy information, which is set based on the at least one stream property for the given stream of addresses, comprises allocation policy information indicative of at least one of:
  a further level of cache to which data from an associated cache entry is to be allocated when evicted from the given level of cache; and
  whether the data from the associated cache entry is to be allocated to any further level of cache when evicted from the given level of cache.

9. The apparatus according to claim 1, in which said at least one of the prefetch circuitry and the cache control circuitry is configured to select, based on the at least one stream property, one of a plurality of initial values to be specified for the cache policy information associated with the at least one prefetched cache entry.

10. The apparatus according to claim 9, in which the plurality of initial values include at least two of:
  a first initial value indicative of the at least one prefetched cache entry having a given priority for replacement and that on eviction of data from the at least one prefetched cache entry of the given level of cache, the evicted data should be allocated to a next level of cache;
  a second initial value indicative of the at least one prefetched cache entry having a higher priority for replacement than indicated by the first initial value, and that on eviction of data from the at least one prefetched cache entry of the given level of cache, the evicted data should be allocated to a next level of cache;
  a third initial value indicative of the at least one prefetched cache entry having a higher priority for replacement than indicated by the first initial value, and that on eviction of data from the at least one prefetched cache entry of the given level of cache, the evicted data should be allocated to a higher level of cache bypassing allocation in the next level of cache; and
  a fourth initial value indicative of the at least one prefetched cache entry having a higher priority for replacement than indicated by the first initial value, and that on eviction of clean data from the at least one prefetched cache entry of the given level of cache, the evicted data should not be allocated to either the next level of cache or the higher level of cache.

11. The apparatus according to claim 10, in which at least one of the second initial value, third initial value and fourth initial value indicates that the at least one prefetched cache entry has a highest priority for replacement.

12. The apparatus according to claim 1, in which the stream prefetch state information comprises stride information indicative of at least one stride offset between respective addresses of the given stream of addresses.

13. The apparatus according to claim 1, comprising stream property tracking circuitry to track the at least one stream property for the given stream of addresses; in which:
in response to detection that prefetching for the given stream of addresses is inactive for a period of duration greater than a threshold duration, the prefetch circuitry is configured to disable the stream property tracking circuitry.

14. The apparatus according to claim 1, in which the given level of cache is a level 1 cache.

15. A non-transitory storage medium storing computer-readable code for fabrication of an apparatus comprising:
prefetch circuitry to generate, based on stream prefetch state information, prefetch requests for prefetching data to at least one cache; and
cache control circuitry to control, based on cache policy information associated with cache entries in a given level of cache, at least one of:
cache entry replacement in the given level of cache; and
allocation of data evicted from the given level of cache to a further level of cache; in which:
the stream prefetch state information specifies, for at least one stream of addresses, information representing an address access pattern for generating addresses to be specified by a corresponding series of prefetch requests;
at least one of the prefetch circuitry and the cache control circuitry is configured to control the cache policy information associated with at least one prefetched cache entry of the given level of cache to which data is prefetched for a given stream of addresses, to set the cache policy information for the at least one prefetched cache entry to a value dependent on at least one stream property associated with the given stream of addresses; and
said at least one of the prefetch circuitry and the cache control circuitry is configured to set the cache policy information for the at least one prefetched cache entry to a value dependent on a length of the given stream of addresses.

* * * * *